Dec. 20, 1966  C. D. MELSON  3,292,946
BUCKING BRONCO BICYCLE
Filed Sept. 11, 1964  2 Sheets-Sheet 1
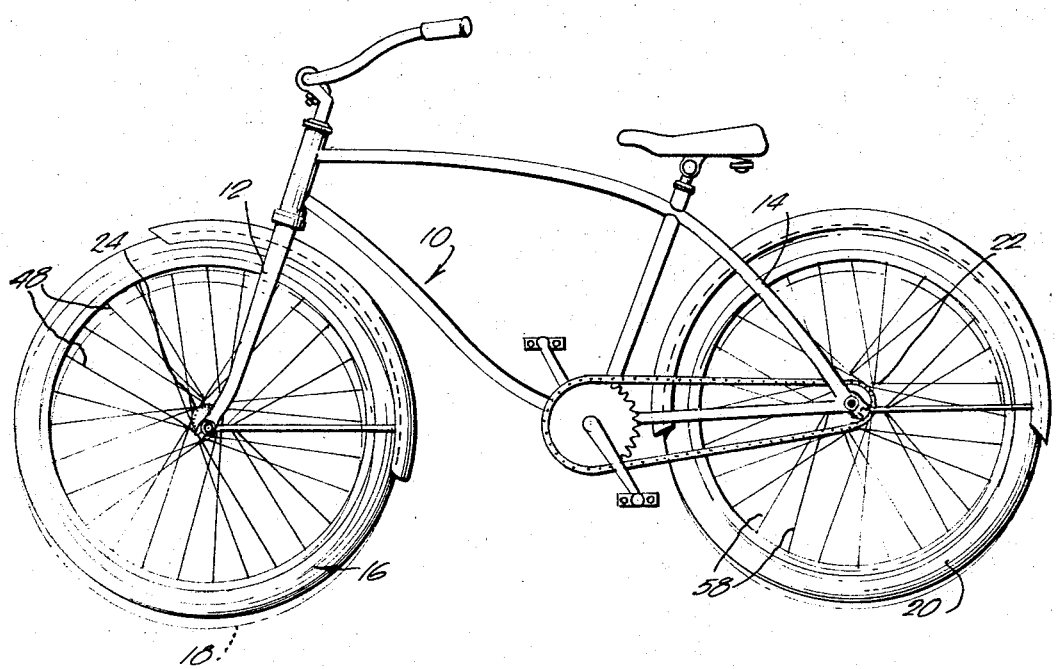
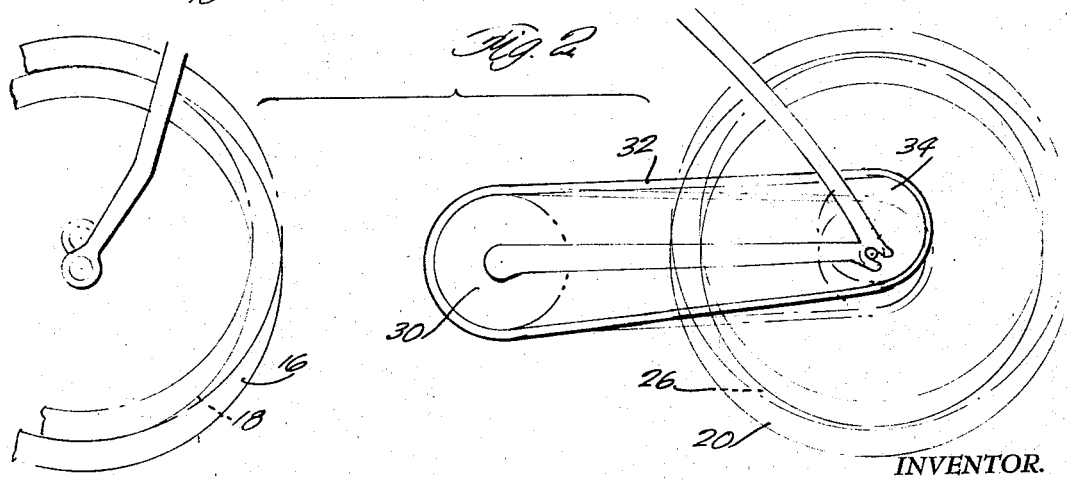
INVENTOR.
Charlie D. Melson
BY *Victor J. Evans & Co.*
ATTORNEYS Dec. 20, 1966 C. D. MELSON 3,292,946
BUCKING BRONCO BICYCLE
Filed Sept. 11, 1964 2 Sheets-Sheet 2
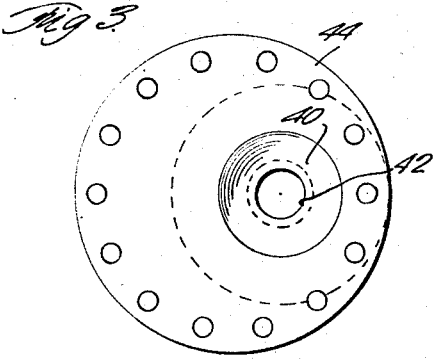
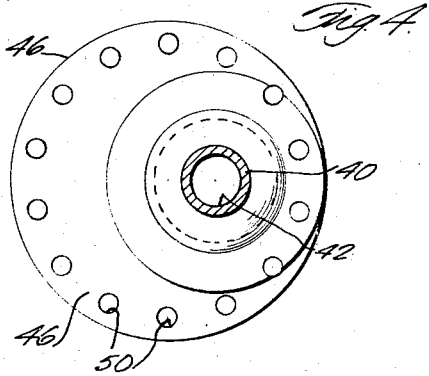
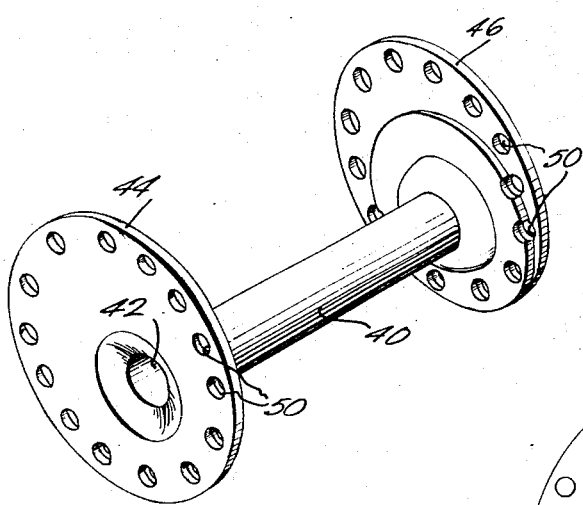
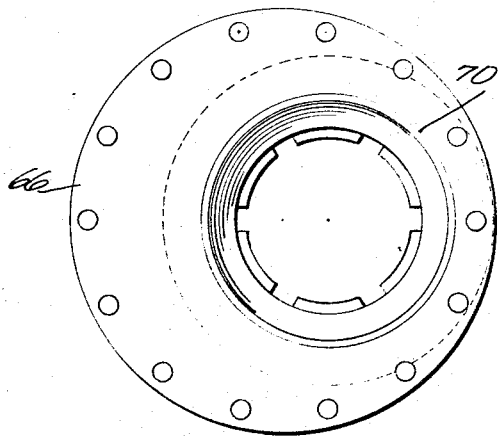
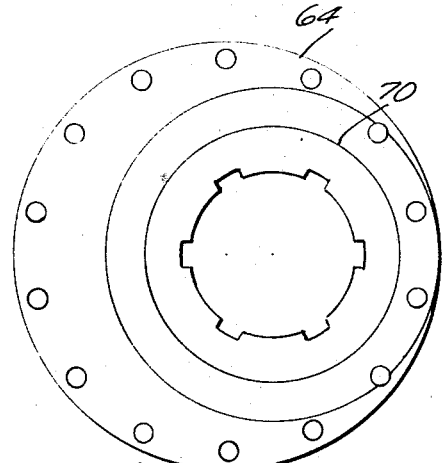
INVENTOR.
CHARLIE D. MELSON
BY
Victor J. Evans & Co.
ATTORNEYS United States Patent Office 3,292,946
Patented Dec. 20, 1966

3,292,946
BUCKING BRONCO BICYCLE
Charlie Dallas Melson, 122 S. Curry St.,
Hampton, Va. 23363
Filed Sept. 11, 1964, Ser. No. 395,883
3 Claims. (Cl. 280—229)

The present invention relates to a front and rear wheel arrangement for a bicycle in which each of the wheels is constructed off-center or eccentrically mounted by a differing amount with respect to each other, so that there is provided a substantial seesaw or bucking bronco type action as the bicycle is rolled or ridden in a forward direction. More particularly, the invention relates to a toy vehicle in which the front and rear wheels are respectively off-center by a differing amount to provide a modulation effect that simulates to a child a forward moving seesaw effect and also an accurately simulated bucking bronco type motion.

The invention seeks to provide a novel front wheel and rear wheel arrangement in which the frame will go up and down as the bicycle rolls. The axle for the front wheel moves the frame two and one-half inches, for example, in total displacement, while the axle for the rear wheel moves the frame up and down a total distance of two inches, to thus provide the forward moving seesaw effect or simulated bucking bronco action. Due to the different eccentricities of the front and rear wheels, the up and down motion caused by the off-center wheels is different at all times as the bicycle rolls.

Accordingly, the present invention is directed to a bucking bronco type bicycle of the type that is attractive to children, and the front and rear wheels made in accordance with the invention are adaptable to conventional type bicycle frames. The up and down motion of the bicycle is found to provide fun and amusement for children.

The present invention seeks to provide a novel and unique amusement device that is easily manufactured in large quantities for market consumption. In another embodiment of the invention, there is provided a front wheel up and down motion equal to one and one-half inches, and in which the front fender and fork are constructed to provide allowance for this eccentric motion, and the rear wheel has an up and down motion substantially equal to one and one-quarter inches and the rear fender and fork are accordingly also constructed for allowing this eccentric motion.

With particular reference to the figures, a basic mechanical embodiment of the features of the present invention is shown in which:

FIGURE 1 is a side elevational view of a bucking bronco type bicycle incorporating the eccentric front and rear wheel arrangements in accordance with the present invention;

FIGURE 2 is a broken away view of the front and rear wheels and fork arrangements of the principal embodiment of the present invention;

FIGURES 3, 4 and 5 show the hub arrangement for the front wheel of the bicycle in accordance with the invention; and FIGURES 6 and 7 show the sprocket arrangement for the rear wheel in accordance with the invention.

Referring now to the drawings, there is shown in FIGURE 1 a bicycle frame 10 having a front fork 12 and a rear fork 14, as well known in the bicycle art. The full-line front wheel 16 shows one position of the eccentrically constructed arrangement, while the broken line 18 shows a position of the wheel as it has rotated from the position shown in full line. The rear wheel 20 also is eccentrically mounted, and an eccentrically constructed rear hub 22 is provided in accordance with the invention, as is more partcicularly described below, together with the front bicycle hub 24.

In FIGURE 2 there is shown a stationary position of the bicycle frame and the respective forks 12, 14, and in which the wheels 16, 20 are shown in their maximum and minimum positions of radii of eccentricity. The dotted line wheel 26 of FIGURE 2 shows the opposite phase of the position of wheel 20, and the figure further shows how the pedal sprocket 30 drives the rear wheel 20 by the chain drive 32 driving the rear wheel sprocket 34. The rear wheel sprocket 34 is not eccentrically mounted with respect to the axle or shaft of the wheel. Essentially, FIGURE 2 is a schematic representation of an arrangement in which the center and the epicenter of the wheel are shown, but the actual representation of the invention is shown in such an embodiment that the wheels are circularly configured, not elliptically constructed, and in which the shaft or axle of each of the wheels is singular in nature. Thus in FIGURES 3, 4 and 5 there is shown the axle or shaft arrangement 40 having an opening 42 passing therethrough for receiving a shaft for mounting it on and with respect to the fork 12, as shown in FIGURE 1. Further, the shaft 40 is provided with flange or hub structures 44, 46 that are essentially circularly in configuration and in which one of the epicenters of the circular hub structures 44, 46 is coaxial or common to the center of the shaft 40 with its opening 42.

The hub structures 44, 46 are configured so that the spoke arrangement 48, shown in FIGURE 1, may be mounted from the peripheral portion of the wheel 16 to connect with the openings 50, 50 that are provided in the hub structures 44, 46. Thus, the wheel has an eccentric center provided in shaft 40 so that it is mounted on the fork 12. In this way, the spokes are the same length and are similarly constructed and installed on the rim of the wheel 16 after having been applied through the openings 50, 50 of the hub arrangements 44, 46. This produces an arrangement in which the center of the hub is eccentrically disposed, as shown in each of FIGURES 3, 4 and 5, for the front hub of the bicycle so that the same spokes and wheel structure may be used, but the hub configuration is adapted or reconstructed from the conventional hub arrangement that is known in the prior art for bicycles.

FIGURES 6 and 7 show a similar construction for the hub applied to the rear fork 14 of the bicycle 10, and in which there are the conventional spokes 58 which constitute the support of the wheel 20 from the rear hub arrangement 64, 66 which are mounted by an axle or shaft 70, much in the same fashion as the front hub arrangement and shaft shown in FIGURE 5. It is essential that the outside dimensions, in other words the maximum and minimum radii, of the circularly configured sets of hub arrangements 44, 46 and 64, 66 be of a different characteristic dimension such as the maximum and minimum radii, respectively, so that there is achieved a continual modulated effect by one riding the bicycle to derive a substantially seesawing effect which may also be called a bucking bronco action as a result of the maximum and minimum radii respectively of the sets of hub arrangements for the front and rear wheels of a bicycle being different.

One embodiment of the invention provides for a front wheel to be off center one-half inch approximately, and the rear wheel to be constructed off center one inch approximately, and thus create the seesaw motion as the rider of the bicycle moves along. One embodiment of the invention provides that the spokes in the wheels may vary in length, or they may be substantially uniform in length and the sole modulating effect is provided by the difference in off-center relation of the axle with respect to the center of the hub arrangements 44, 46 or 64, 66, respectively.

The advantages of the present invention are that a see-saw motion or bucking bronco action is provided to vary the pitch and/or roll of the bicycle or toy vehicle, since each of the wheels is provided with a different off-center measurement. The bucking bronco bicycle is easy to manufacture as the spokes thereof may be made varying in length or even uniformly length spokes may be used as in conventional type bicycles.

It should be understood that the specific apparatus herein illustrated and described are intended to be representative only, as many changes may be made therein without departing from the clear teachings of the invention. Accordingly, reference should be made to the following claims in determining the full scope of the invention.

What is claimed is:

1. In a bicycle having a frame and a pivotal fork mounted in front thereof and a driving fork mounted in the rear thereof, a hub for cooperating with the front fork of the bicycle having openings along its periphery disposed in circular configuration to mount a wheel rim from spokes passing through said openings, in which the hub has an off-centered shaft opening for receiving a shaft for mounting on the hub, a chain driven hub having an eccentrically located opening for receiving means cooperating with the rear fork, said driven hub having openings along its periphery disposed in circular configuration for mounting a rear wheel rim from spokes passing through the said openings in the driven hub, said hubs having different dimensions for providing a modulated motion as the bicycle moves forwardly.

2. In a bicycle having a frame and a fork mounted in front thereof and a driving fork in the rear thereof, a hub for cooperating and being mounted upon said front fork and having a circular peripheral edge thereof in which openings are provided along the circular periphery for providing an off-centered arrangement as a front wheel rim is mounted upon said hub, a chain driven hub having an eccentrically located opening for receiving means cooperating with the rear fork, said driven hub having a circular peripheral edge in which openings are mounted along said circular periphery for receiving spokes to mount a rear wheel rim in an off-centered arrangement, and said hubs having different dimensions.

3. The invention according to claim 2 wherein spokes of generally equal lengths may be used to increase the off-center relationship of each of the wheels mounted from the front hub and the driving hub, respectively.

References Cited by the Examiner

UNITED STATES PATENTS

| | | | |
|---|---|---|---|
| 499,009 | 6/1893 | Bunker | 280—229 |
| 605,182 | 6/1898 | Johnston | 280—229 |
| 1,256,454 | 2/1918 | Evesson | 280—229 |
| 2,125,568 | 8/1938 | Huyssen et al. | 280—229 |
| 2,555,480 | 6/1951 | Fischer | 280—229 |
| 3,152,813 | 10/1964 | Brown | 280—229 X |

KENNETH H. BETTS, *Primary Examiner.*